United States Patent

Schenk

[11] 3,975,804
[45] Aug. 24, 1976

[54] FRONT INSERT RECEPTACLE

[75] Inventor: Peter Schenk, West Islip, N.Y.

[73] Assignee: Dzus Fastener Co., Inc., West Islip, N.Y.

[22] Filed: Jan. 14, 1976

[21] Appl. No.: 649,203

[52] U.S. Cl. ............................................. 24/221 A
[51] Int. Cl.² ........................................ A44B 17/00
[58] Field of Search .......... 24/221 R, 221 A, 221 L, 24/221 K

[56] References Cited
UNITED STATES PATENTS

| | | | |
|---|---|---|---|
| 2,442,064 | 5/1948 | Veit | 24/221 A |
| 2,499,574 | 3/1950 | Dzus | 24/221 A |
| 2,599,207 | 6/1952 | Spahr et al. | 24/221 K |
| 2,610,379 | 9/1952 | Bugg | 24/221 A |
| 3,443,783 | 5/1969 | Fisher | 24/221 R X |
| 3,504,875 | 4/1970 | Johnson et al. | 24/221 K X |
| 3,561,076 | 2/1971 | Gunther | 24/221 A |
| 3,744,101 | 7/1973 | Gley | 24/221 K |

*Primary Examiner*—Donald A. Griffin
*Attorney, Agent, or Firm*—Kane, Dalsimer, Kane, Sullivan and Kurucz

[57] ABSTRACT

A front insert receptacle for use in fastening two members together. The receptacle including housing opened at one end to removeably receive a stud therein. A stop surface is on the housing to engage with the upper surface of one member when the receptacle is partially extended through an opening therein. Structure is on the housing to form a rotational stop to prevent the housing from rotating with respect to the one member when it is extended therein. At least one cam slot is on the housing and a corresponding cam follower is captured by the cam slot and is initially in a first position when the housing is inserted in the one member. Biasing structure is on the housing in engagement with the cam follower and responsive to engagement of the cam follower and rotation thereof along the cam slots until in alignment with a portion of the slot which permits the biasing means to direct a portion of the cam follower into engagement with the under surface of the one member to retain the receptacle in position on the one member. Finally, a stud lock is on the housing adapted to engage with a stud after a housing has been mounted on the one member and the stud has been mounted in the other member and inserted into the housing. Thereafter, relative rotation of the stud with respect to the housing in one direction will compress the biasing means, activate the stud locking means, and draw the two members into fixed interengagement and relative rotation of the stud with respect to the housing in a second direction will deactivate the stud lock and permit the stud to be removed from the housing and the two members to be separated.

16 Claims, 21 Drawing Figures

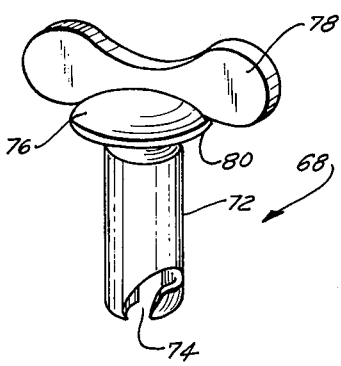
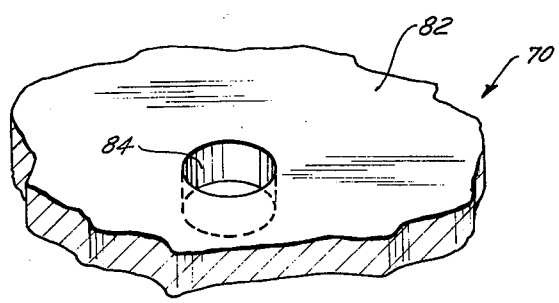
FIG. 1
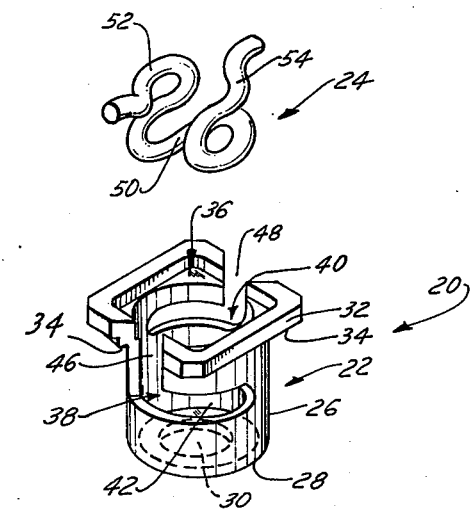
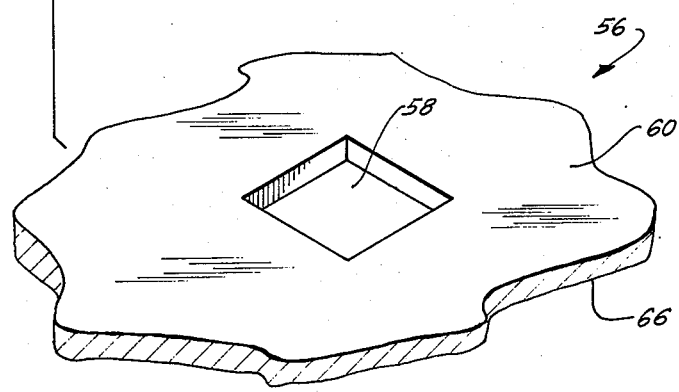

FRONT INSERT RECEPTACLE

BACKGROUND OF THE INVENTION

There are many types of fasteners in use today which employ fixed receptacles for coupling with a fastener stud. The object of such an assembly is to mount the receptacle to one of two members to be fastened and then to place the stud in the other member to be fastened in position so that the components can be interconnected in a manner which fastens the two members together. This type of structure is prevelant in wall mountings and in panel to panel arrangements for cabinet type use for example.

In many environments it has been found that it is extremely difficult to gain excess to the rear side of one of the members being fastened for purposes of mounting the receptacle in position to receive the stud portion of the fastener assembly. It is common practice to design receptacles with conventional type of mounting structure employed for fastening the receptacle to a panel or wall from the rear side with an acess opening in the panel or wall aligned with the interior chamber of the receptacle. In this manner, the receptacle exposed surface is substantially flush to the exposed surface of the wall or panel so that there is no projecting portion. This makes it easier for providing a surface interengagement between panels or other similar type members which are being coupled by the fastener assembly.

In order to save cost in assembly time particularly where a large number of fasteners are to be employed, it is advantageous to provide a receptacle which can be inserted from the exposed outer surface of the rear member being fastened and then to be locked in position by activation of locking means from the side of the panel through which the receptacle has been inserted. In addition to the time saving factor of such an assembly is of course also a great advantage to be able to extend the receptacle in from the exposed side particularly where the rear side of the panel or wall is at a location where access is difficult if not impossible.

It should also be kept in mind that the receptacle assembly should be of a minimum number of component parts and simple in design in order to keep the cost of the receptacle at a minimum both from a manufacture and an assembly standpoint.

SUMMARY OF THE INVENTION

With the above background in mind, it is among the primary objectives of the present invention to provide a front insert receptacle adapted to be mounted into a flat surface member such as a panel by insertion of one side thereof and then fastened by appropriate manipulation from the same exposed side of the member or panel to which is inserted. The receptacle is of low cost construction and is of a minimum number of parts and is designed to be quickly and efficiently inserted. All of these factors enhance the minimum cost feature of the receptacle which is of great advantage when the receptacles are to be mass produced and to be used in large numbers. The present receptacle is designed for use with a stud of the type employing a spiral cam slot which is designed for quarter turn action in locking and unlocking the stud with respect to the receptacle. This type of arrangement is commonly used in dealing with the fastening of a panel to panel arrangement or mounting a structure on a wall surface where access to the rear side of the receiving surface is difficult or impossible. The entire assembly operation including insertion of the receptacle and fastening and unfastening of the stud with respect thereto is accomplished from the exposed side of the rear panel or wall surface. A minimum number of components are employed and the fastener can be easily inserted into the rear panel or member and then quickly and easily actuated to be shifted into a locked position within the panel with the appropriate receiving surfaces exposed for coupling with the stud portion of the fastener assembly.

In summary, a front insert receptacle for fastening two members together is provided. The receptacle includes a housing opened at one end to removably receive a stud therein. A stop surface is on the housing to engage with the upper surface of one member when the receptacle is partially extended through an opening therein. Rotational stop means is on the housing to prevent rotation of the housing with respect to the one member when extended therein. At least one cam slot is on the housing and a cam follower is captured by each cam slot and is initially in a first position when the housing is inserted in the one member. Biasing means is on the housing and engagement with the cam follower and responsive to engagement of the cam follower and movement thereof along the cam slot until it is in alignment with a portion of the slot which permits the biasing means to direct a portion of the cam follower into an engagement with the under surface of the one member to retain the receptacle in position in the one member. Finally, stud locking means is on the housing and is adapted to engage with a stud after the housing has been mounted on the one member and the stud has been mounted on the other member and inserted into the housing. Thereafter, relative rotation of the stud with respect to the housing in one direction will compress the biasing means, activate the stud locking means and draw the two members into fixed interengagement. Relative rotation of the stud with respect to the housing in a second direction will deactivate the stud locking means and permit the stud to be removed from the housing and the two members to be separated.

With the above objectives among others in mind, references had to the attached drawings.

BRIEF DESCRIPTION OF THE DRAWINGS

FIG. 1 is an exploded view of the receptacle of the invention in alignment with fragmentary portions of two panels to be fastened and a stud to be assembled therewith;

DESCRIPTION OF THE PREFERRED EMBODIMENTS

Figure 2:
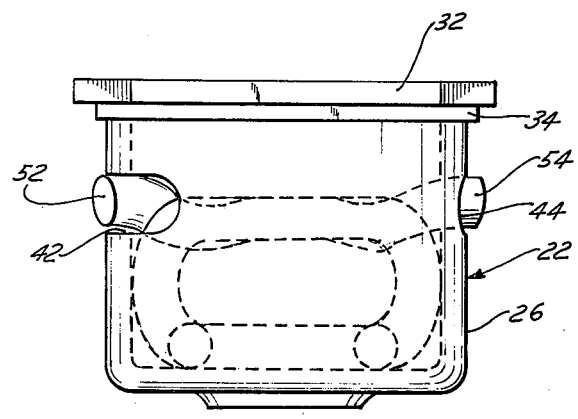
FIG. 2 is a side elavation view of the receptacle.
Figure 3:
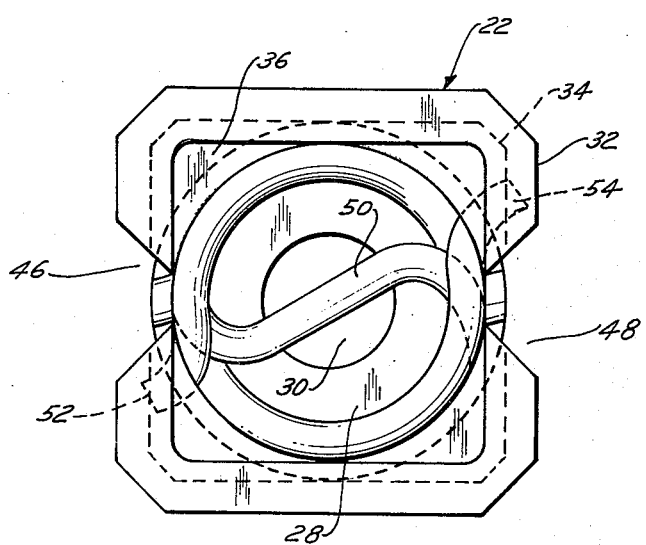
FIG. 3 is a top view thereof.
Figure 4:
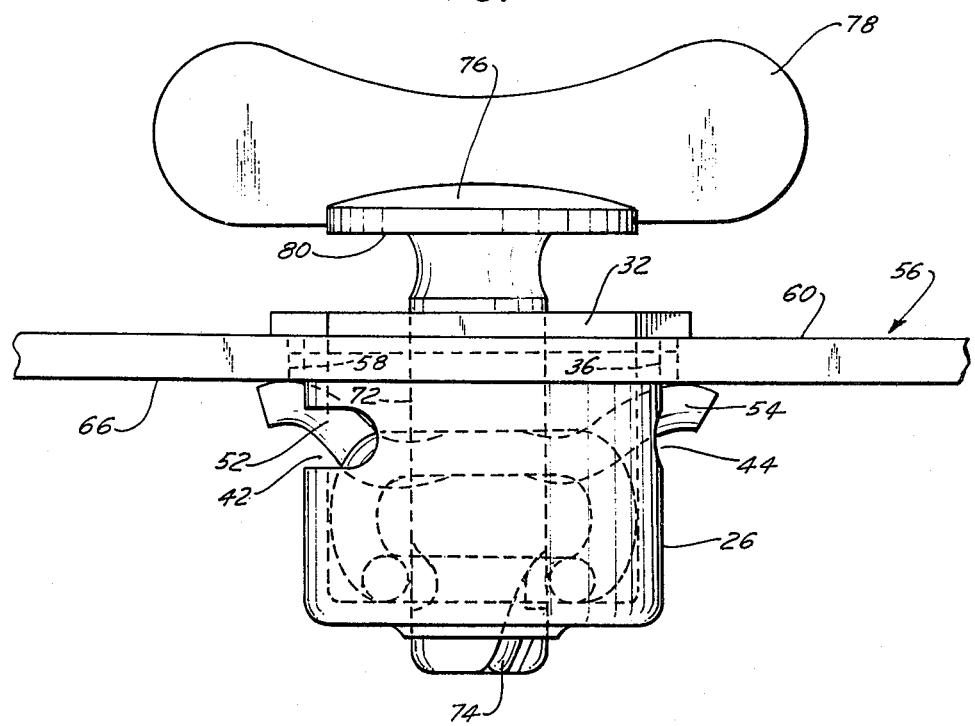
FIG. 4 is a side elavation view thereof with the receptacle position in a panel and a stud coupled therewith with the receptacle mounted in the panel.
Figure 5:
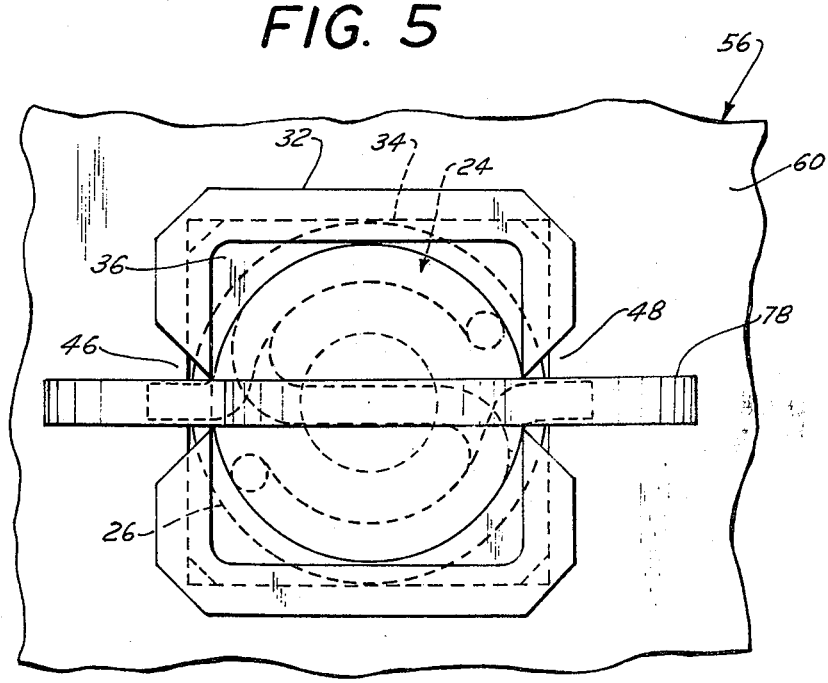
FIG. 5 is a top plan view of the receptacle in the condition of FIG. 4.
Figure 6:
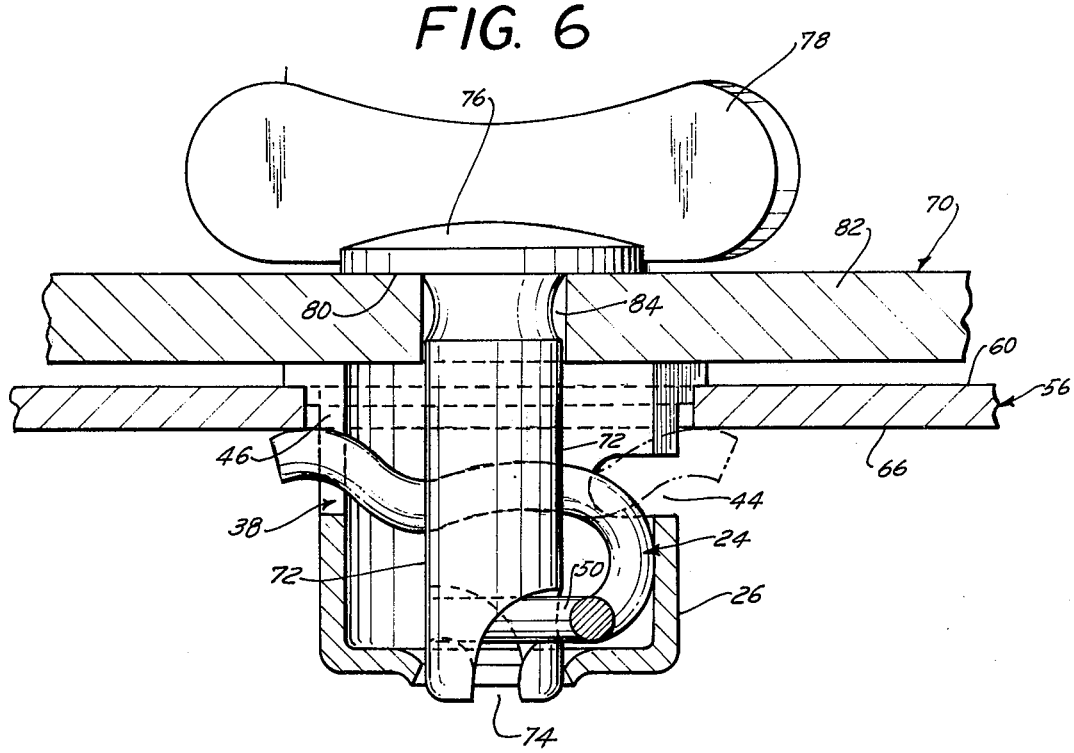
FIG. 6 is a sectional side elavation view thereof with the receptacle having been mounted to the first panel and the stud coupled therewith to fasten a second panel to the first panel.
Figure 7:
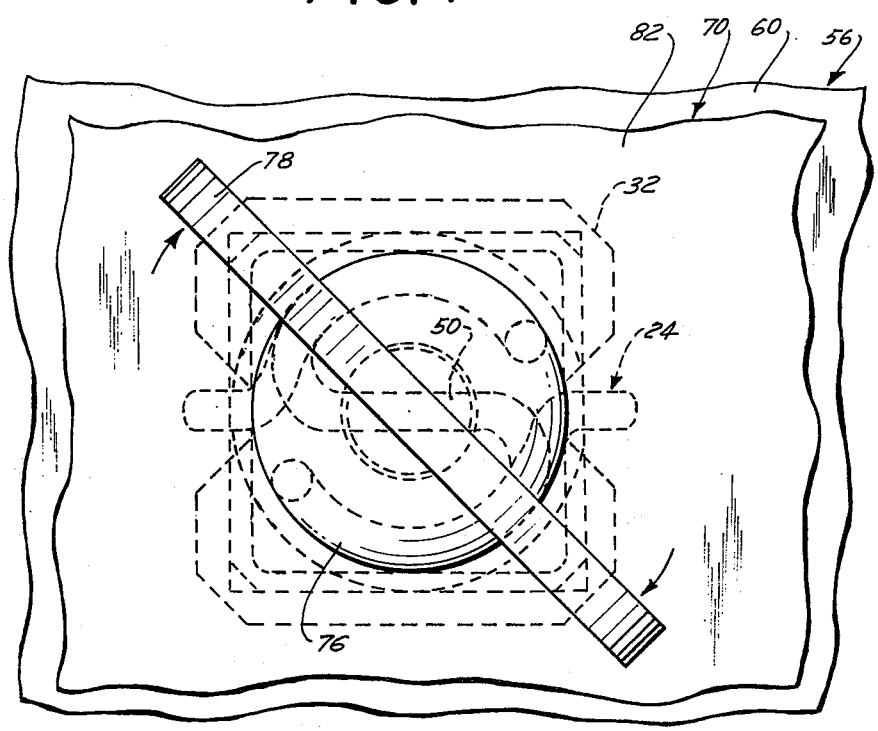
FIG. 7 is a top plan view of the receptacle in the condition depicted in FIG. 6.
Figure 8:
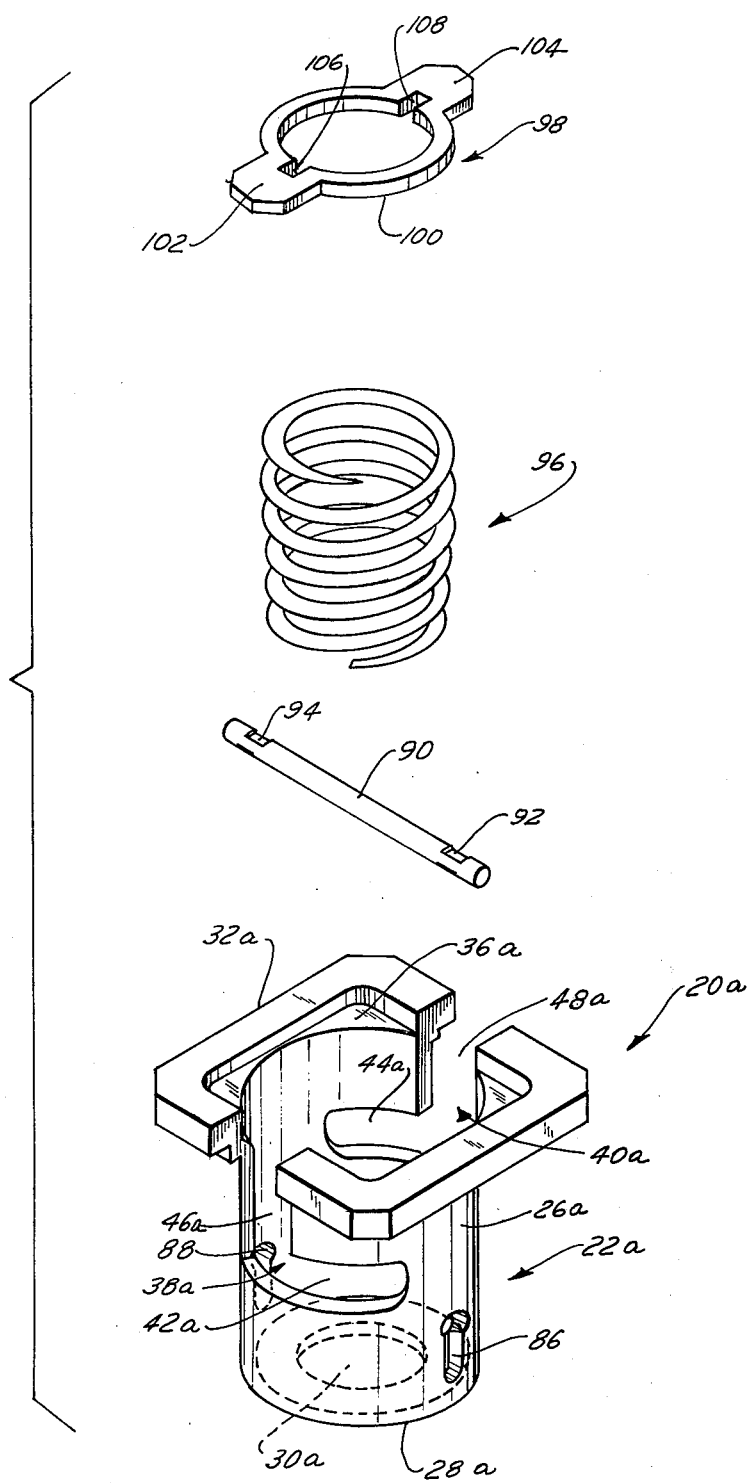
FIG. 8 is an exploded perspective view of an alternative form of the receptacle of the invention.
Figure 9:
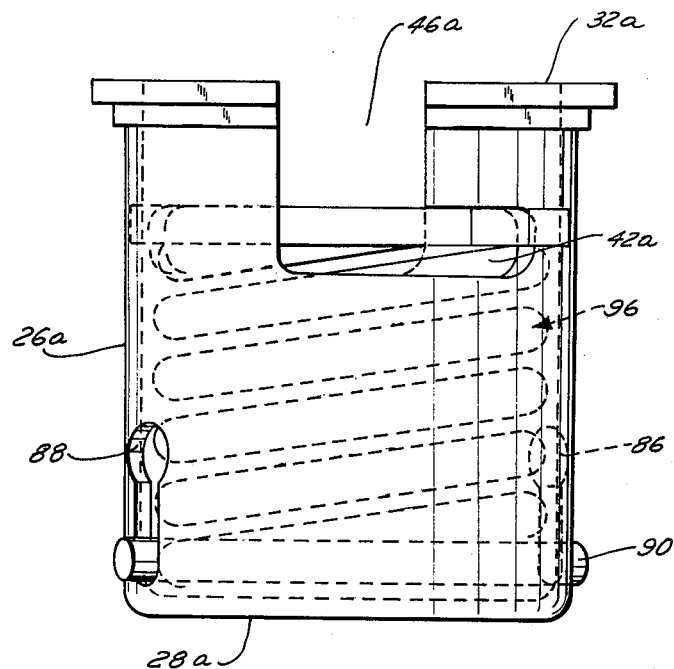
FIG. 9 is a side elavation view thereof showing the receptacle in the initial position prior to mounting to a panel.
Figure 10:
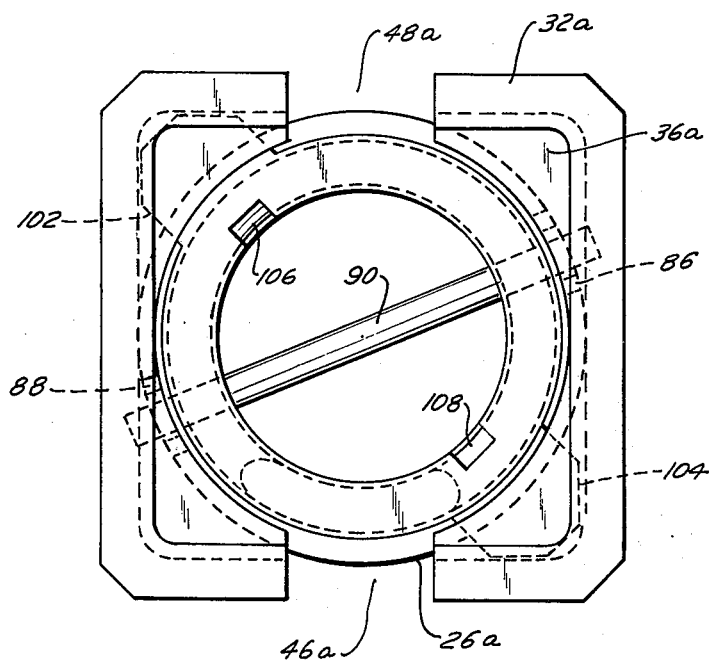
FIG. 10 is a top view thereof showing the receptacle in the condition of FIG. 9.
Figure 11:
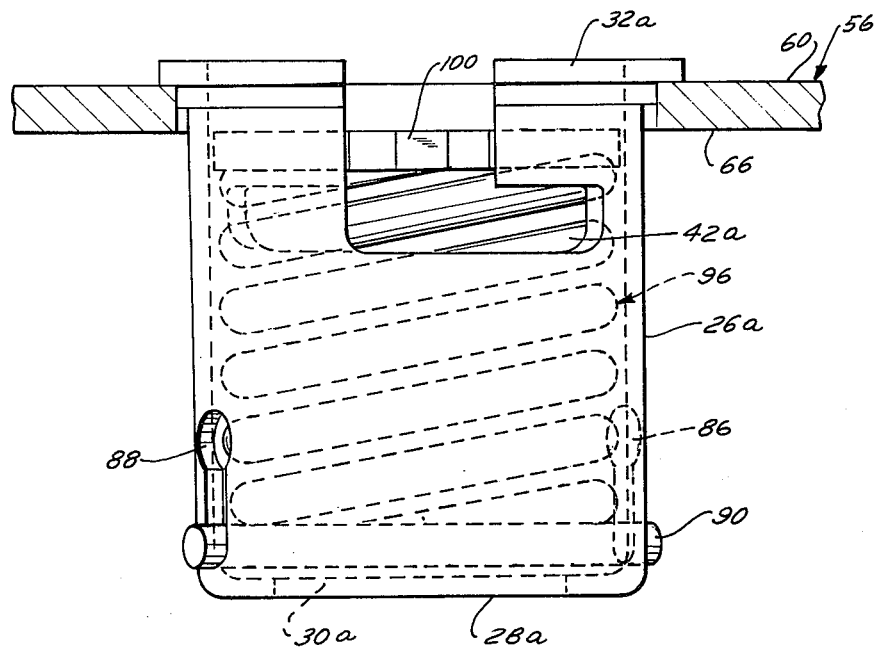
FIG. 11 is a side elavation view thereof showing the receptacle mounted to a panel.
Figure 12:
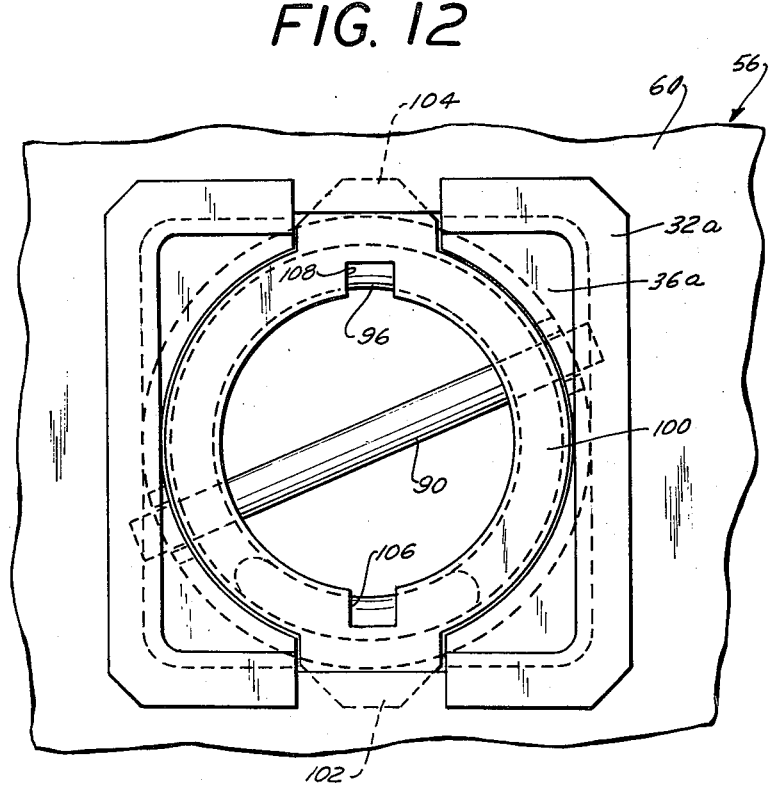
FIG. 12 is a top plan view thereof showing the receptacle in the condition of FIG. 11.
Figure 13:
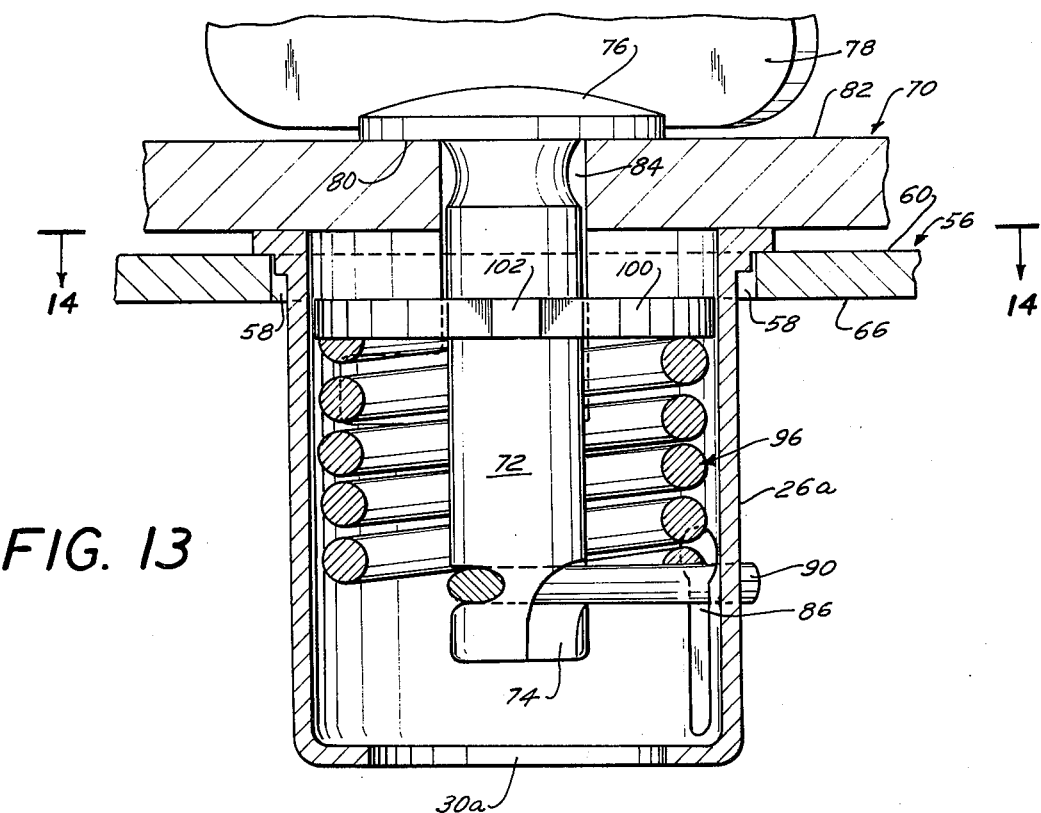
FIG. 13 is a side elavation view thereof showing a stud coupled therewith to fasten two panels together.
Figure 14:
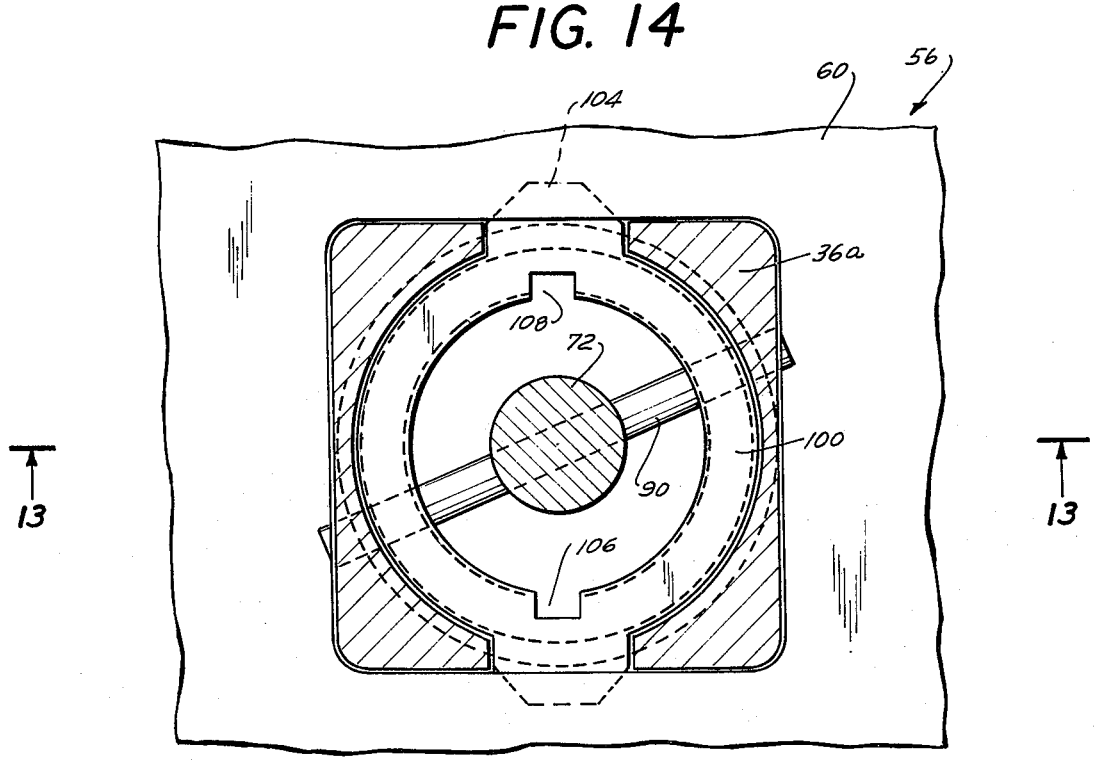
FIG. 14 is a top plan view thereof showing the receptacle and stud assembly in the arrangement of FIG. 13.
Figure 15:
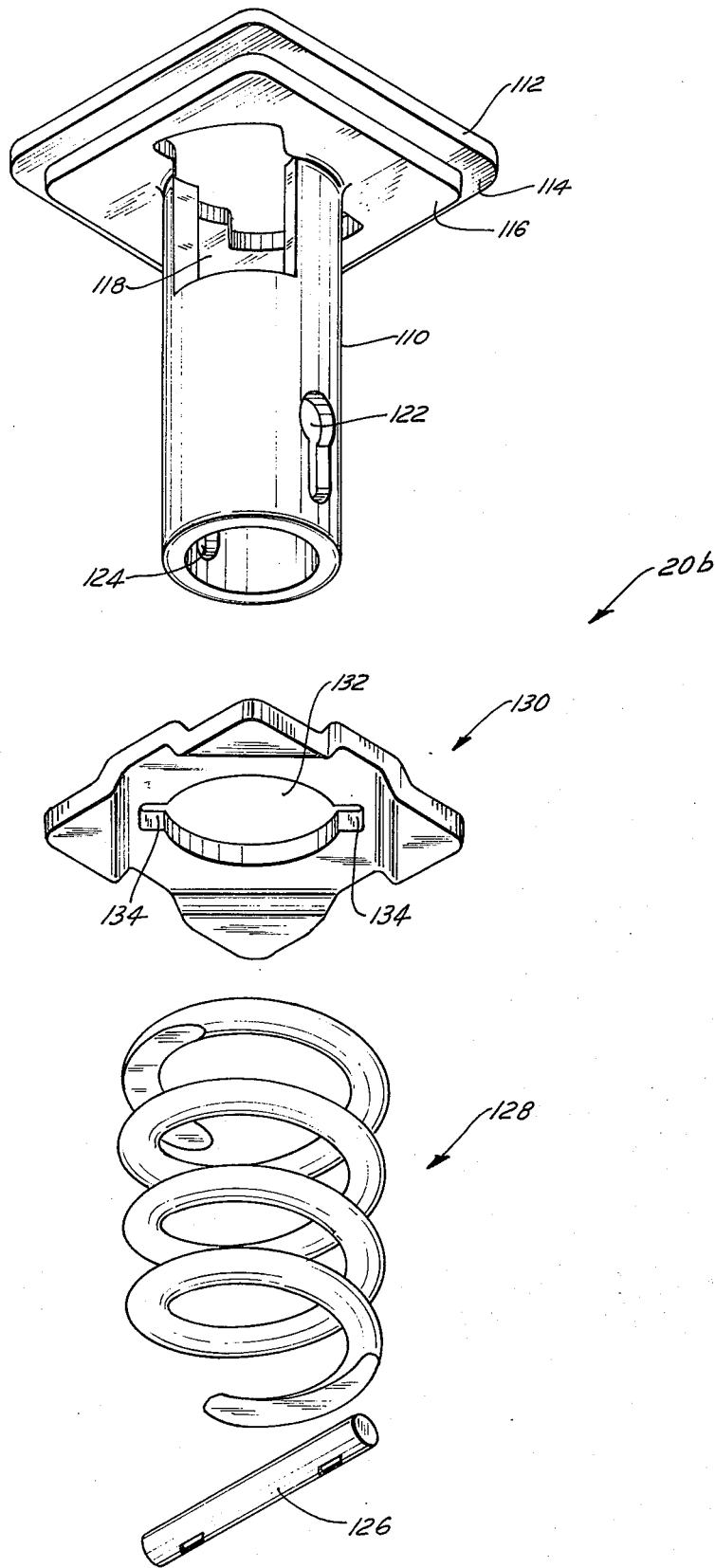
FIG. 15 is an exploded perspective view of a second alternative form of the receptacle of the invention.
Figure 16:
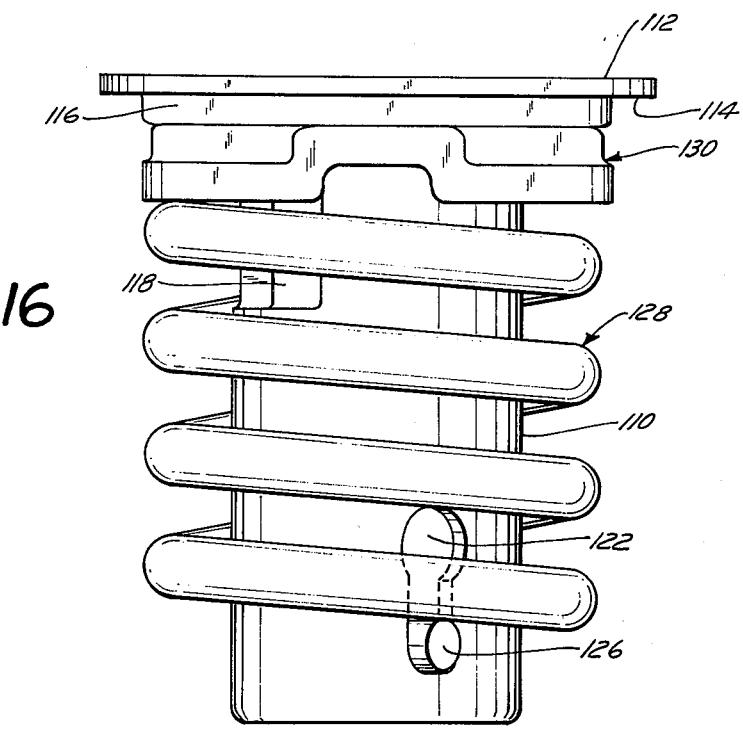
FIG. 16 is a sectional side elavation view of the second alternative form of the receptacle shown prior to insertion in a panel.
Figure 17:
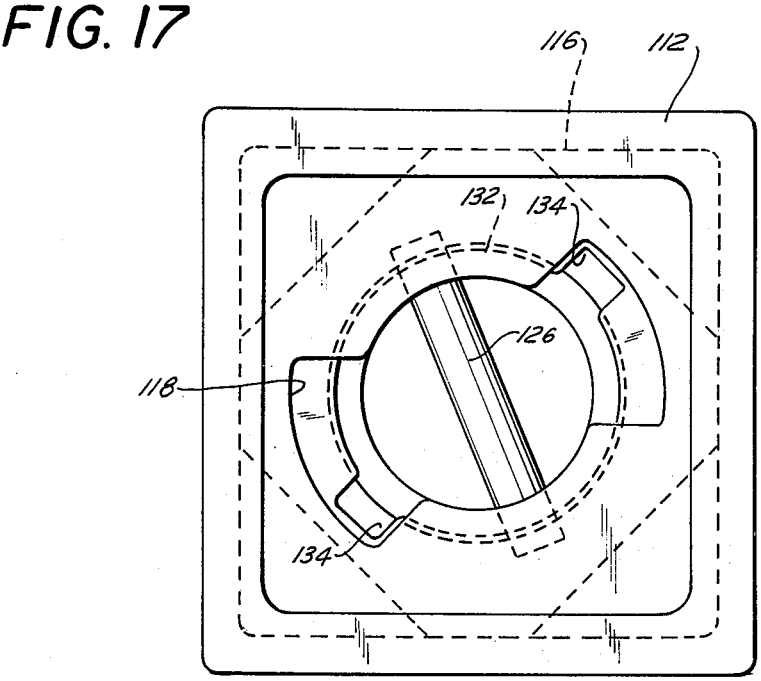
FIG. 17 is a top plan view thereof showing the receptacle in the condition of FIG 16.
Figure 18:
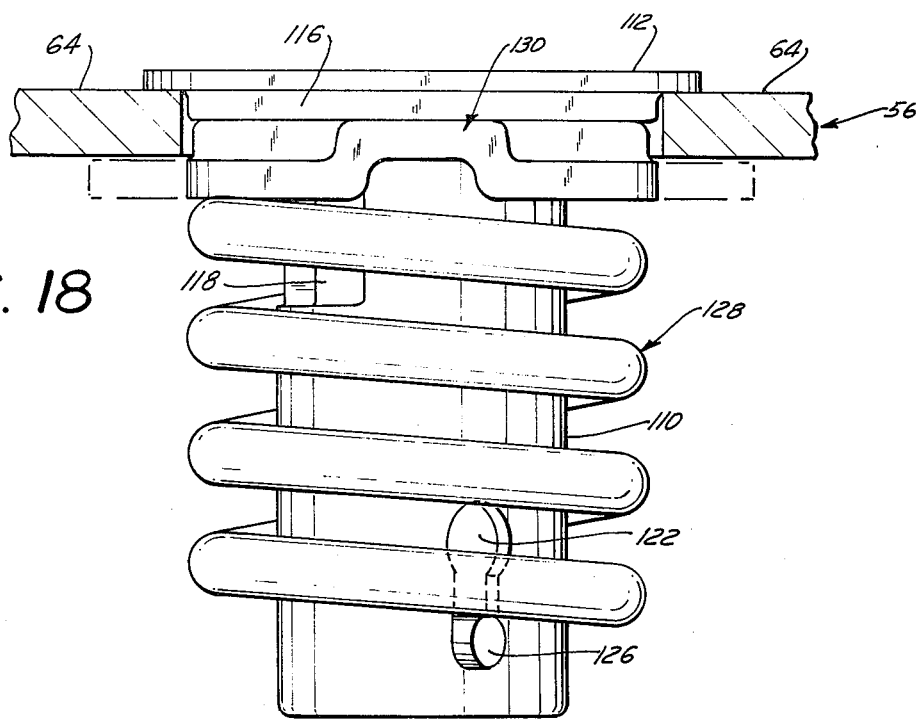
FIG. 18 is a sectional side elavation view of the second alternative form of the receptacle shown mounted in fixed position in one or two members to be fastened.
Figure 19:
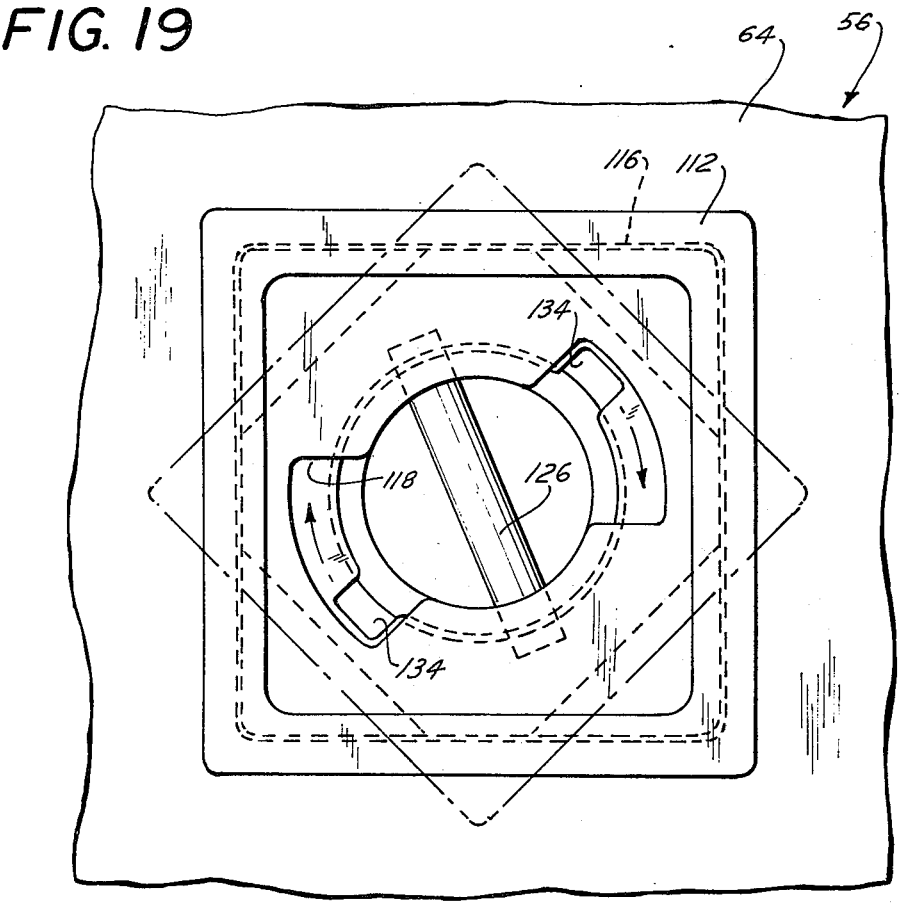
FIG. 19 is a top plan view of the second alternative form of the receptacle in the condition depicted in FIG. 18.
Figure 20:
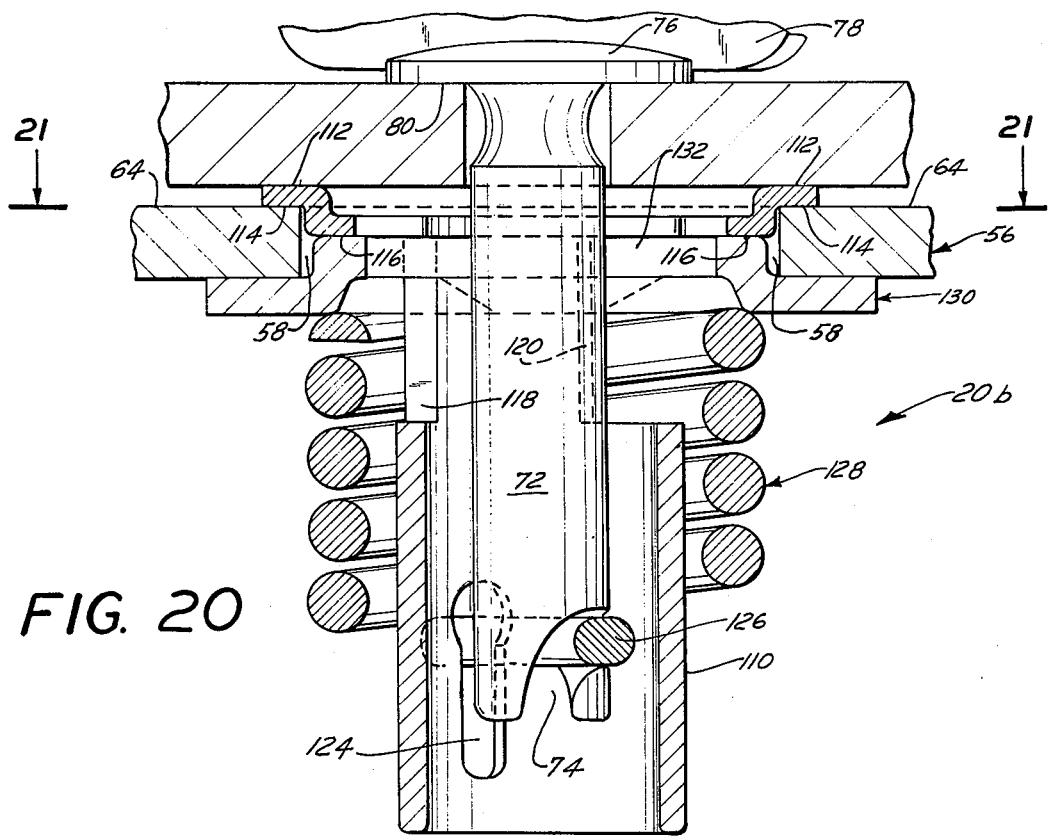
FIG. 20 is a sectional side elavation view of the second embodiment of the receptacle shown coupled to a fastener to hold two panels together.
Figure 21:
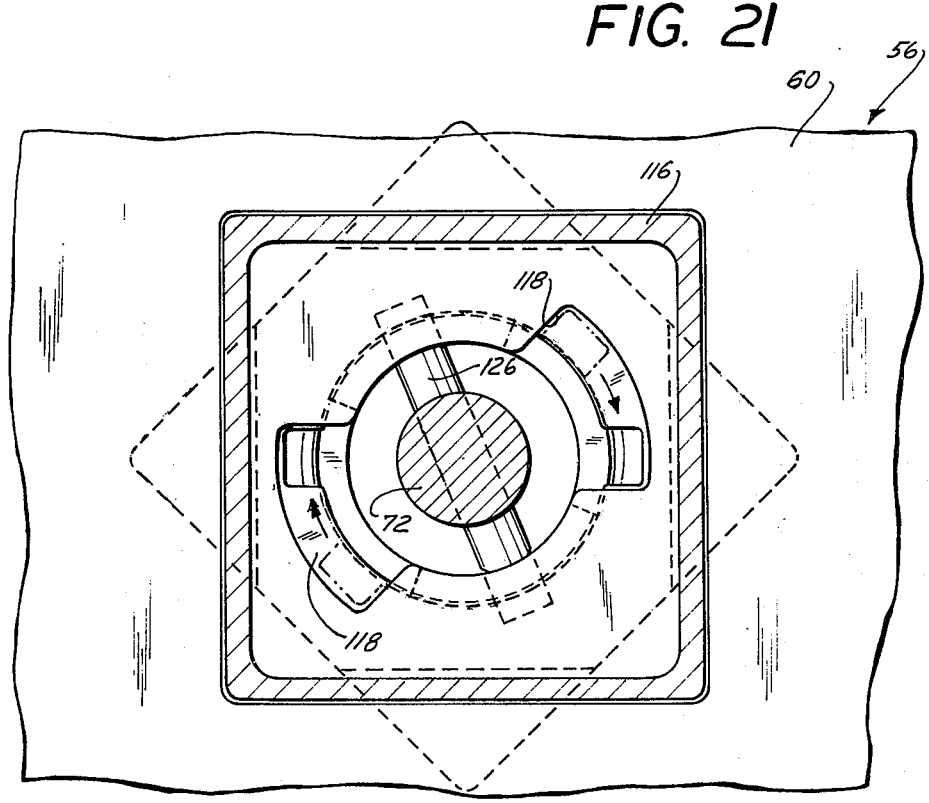
FIG. 21 is a top plan view thereof showing the receptacle as depicted in FIG. 19.

The receptacle of the present invention is shown in threee representative embodiments in the drawings and each embodiment will be discussed in detail below. The initial form is depicted in FIGS. 1–7, a first alternative embodiment is depicted in FIGS. 8–14 and a second alternative embodiment is depicted in FIGS. 15–21. All of the components of the three embodiments of the receptacle are designed so that they can be manufactured of a conventional metal or plastic material. Naturally cost of manufacture and assembly are factors which bear on the choice of material for the device. The receptacle is particularly designed for use in panel to panel arrangements or mounting of fixtures or other structures to a wall surface where the receiving panel or surface is of the type where access to the rear side thereof is difficult or impossible. The receptacle must be mounted entirely from the exposed front surface of the receiving panel. Actually this type of receptacle can also be used in structures where access is available to the rear side of the receiving panel, however, it is deemed to be more convenient and desirable to mount the entire fastener assembly from the front side in any event.

In the initial form, receptacle 20 includes two components, a receptacle housing 22 and a double wound spring 24 adapted to be mounted in the housing. The housing 22 includes a cup shaped tubular bottom portion 26 having a somewhat closed bottom end 28 to assist in capturing the spring within the housing. A central aperture 30 is in the bottom surface 28 for extension of a portion of a stud therethrough in a manner discussed in detail below. The upper end of tubular cup shaped body portion 26 terminates in a peripheral flange 32 which may have any desired configuration such as the square shaped configuration depicted in the drawings. The under side 34 of lateral flange 32 terminates at the inward edge in a square shape shoulder 36 which is integrally formed with the upper end of tubular body 26.

A pair of opposed openings 38 and 40 are in the side walls of tubular portion 26 and include a lower horizontal portion 42 and 44 respectively. Horizontal portion 42 is closed at one end and communicates at the other end with a vertical slot or opening 46. Similarly, horizontal slot 44 is closed at one end and communicates at the other end with vertical slot or opening 48. Both openings 46 and 48 extend upwardly through square shaped shoulder 36 and flange 32 so that the slots are opened at the upper end.

Spring 24 includes a transverse base 50 terminating at a pair of free legs 52 and 54. Spring 24 is of a material which has sufficient resilience for the transverse member 50 and the legs 52 and 54 to act as spring members. The interior of tubular portion 26 of receptacle 22 is large enough to receive spring 24 therein with transverse base portion extending approximately diametrically across the interior of the tubular portion and the legs 52 and 54 housed within horizontal slots 42 and 44 respectively when the legs have been subjected to a compression load. In this condition, the receptacle 20 is ready for mounting in a panel.

The distance between the underside 34 of flange 32 and the location of legs 52 and 54 in the horizontal slots 42 and 44 is greater than the panel thickness into which the receptacle is installed. Accordingly the receptacle will fit into panels with a variety of desired thickness. The same variety of the receptacle is present in all embodiments which are designed to accummulate a variety of panel thickness in a similar manner.

The panel 56 which is to receive the receptacle includes a square shaped aperture 58 which corresponds in shape to the shoulder 36 of the receptacle housing. In fact opening 58 is slightly larger than the shoulder so that the shoulder can be positioned within the receiving aperture 58. Naturally the configuration of aperture 58 and shoulder 36 is a matter of choice as long as they mate and have interfering surfaces to prevent relative rotation of the receptacle with respect to the panel.

The flange 32 is of greater dimensional width than aperture 58 in the panel so that under surface 34 of the flange engages with the upper surface 60 of the panel and prevents passage of the receptacle entirely through the panel.

The receptacle is thus in position for being mounted to panel 56. This is accomplished by inserting an appropriate tool through the opening in the receptacle housing 22 and engaging transverse portion 50 of spring 24. The transverse portion is rotated with respect to the receptacle which is held in position by interengagement between shoulder 36 and the walls of aperture 58 in the panel. Rotation of transverse portion 50 causes simultaneous rotation of legs 52 and 54 along slots 42 and 44 until they come in alignment with vertical portions 46 and 48. Once legs 52 and 54 are in alignment with vertical slots 46 and 48 respectively, the compressed spring 24 will return toward the relaxed position and the ends will travel upward in the vertical slots into engagement with the under surface 66 of panel 56 with the spring being still under compression so that it provides tight interengagement with the upper and lower surface of panel 56 with the panel captured between the under surface 34 of flange 32 and legs 52 and 54 of the spring. Receptacle 20 is then in fixed position for reception of an appropriate stud 68 for completion of a fastener assembly for coupling a second member such as panel 70 with panel 56.

Stud 68 is of a conventional type having a tubular body 72 and a spiral cam slot 74 in one end of the tubular body. The other end of stud 68 has an enlarged head portion 76 with an appropriate gripping surface thereon. In the depicted embodiment the gripping surface is in the form of a wing projection 78. The under surface 80 of enlarged head 78 is adapted for engagement with the upper surface 82 of the second panel 70. An aperture 84 is provided through panel 70 and is large enough to receive a tubular body portion 72 therethrough. The diameter of opening 84 is smaller than the under surface 80 of head 76 so that engagement occurs between the under surface of the head and the upper surface 82 of panel 70. Opening 84 is brought into alignment with the opening at the upper end of receptacle housing 22 and stud 68 is inserted through the aligned openings until spiral cam slot 74 engages with transverse portion 50 of spring 24. Thereafter, gripping of head 78 and rotation of stud 68 will cause transverse portion 50 of spring 24 to travel along spiral cam slot 74 to the end and slightly recessed position which forms a locking detent. The resilient nature of the spring causes vertical movement between the interconnected parts so that panel 70 and 56 are brought into tight interengagement. Rotation of the stud in the reverse direction will disengage spring 24 from cam slot 74 and permit removal of the stud and disassembly of panel 70 from panel 56. The spiral cam slot 74 can be of any desired length and it has been found convenient for shifting between the locked and unlocked position to be accomplished with a quarter turn rotation of the stud. In this manner, the panels can be quickly and efficiently fastened and unfastened. The resilient nature of spring 24 permits its travel in spiral cam slot 74 and also provides for the necessary vertical travel between components to provide the tight interengagement and also to accommodate various thickness panels. In fact the resilient nature of the entire spring 24 facilitates use of receptacle 20 with a variety of different thickness panels without changing the dimensional structure of the receptacle. This feature is true with respect to the openings relationship, in engaging with the under surface of panel 60 and with respect to the openings use in coupling panels 60 and 70 together.

A second form of the invention is depicted in FIGS. 8 to 14 of the drawings and is identified as receptacle 20a. Similar structural features bear the same reference numeral as in respect to the initially discussed embodiment with the addition of the subscript a. Receptacle having 22a includes a similar leaf shaped tubular body portion 26a with a cup shaped bottom wall 28a having a central aperture 30a to accommodate the end of stud 68 when the receptacle is used as apart of a fastener assembly. The upper end of housing 22a is open and is surrounded by a peripheral flange 32a inwardly connected with the tubular body 26a by intermediate shoulder 36a of square shaped configuration to fit into square shaped opening 58 of panel 56. The same type of opposed slot arrangements 30a and 40a are provided with the interconnected horizontal and vertical slots being adapted to receive a cam follower arrangement. The horizontal legs 42a and 44a communicate with vertical legs 46a and 48a respectively. The vertical legs of the slots are opened at the upper end to provide for an access to the under surface of panel 56 when the receptacle is mounted therein. The only material difference in structure of housing 22a resides in the provision of a pair of opposed vertical key ways 86 and 88 which are located diametrically opposite in the side walls of tubular portion 26a. Mounted in the key ways is a tubular pin 90 which can be inserted through the larger upper portion of the key way and then dropped into the smaller diameter lower portion with notches 92 and 94 engaging with the side walls of key way 86 and 88 respectively. In this manner, the pin is prevented from sliding laterally out of tubular housing 26a. Positioned on transverse bar 90 is a helical compression spring 96 which is placed under compression by engagement from above by ring shape latch 98. Latch ring 98 includes a central ring shape portion 100 having an aperture for passage of by portion 72 of stud 68 therethrough and has a pair of diametrically opposed lateral tabs 102 and 104 extending therefrom. When latch 98 is positioned on spring 96 which in turn is positioned on pin 90 in receptacle housing 22a and a compression force is applied to latch ring 98, helical spring 96 will be compressed until tabs 102 and 104 are aligned with horozontal slots 42 and 44 respectively whereupon rotation of the ring 100 will seat tabs 102 and 104 in the horizontal slots completing assembly of the receptacle for insertion through aperture 58 and panel 56. Tabs 102 and 104 are permitted to pass within receptacle housing 22a through a vertical slot portion 46 and 48 respectively. The inner edges of tabs 102 and 104 are provided with knotches 106 and 108 which facilitate engagement by an appropriate tool such as a screwdriver to rotate the latch ring 98.

Upon insertion through aperture 58 shoulder 36a will be located within the aperture in a similar manner as in the first discussed embodiment with the under surface of flange 32a engaging with the upper surface 64 of the panel. Thereafter an appropriate tool is engaged with notches 106 and 108 and flange ring 98 is rotated until tabs 102 and 104 are aligned with the vertical portions of the slots. Compressed spring 96 will then drive the ring upward until the upper surface of tabs 102 and 104 lockingly engage with the under surface 68 of panel 56 to thereby lock the receptacle in position.

In the same manner as with the previous embodiment, panel 70 and stud 68 can then be coupled with the receptacle and panel 56 with the fastening and unfastening engagement occuring between cam slot 74 and transverse pin 90. Vertical reciprication of the pin 90 is permitted by the opening 96 and slots 86 and 88. As is true with request to the previous embodiment, should the panel thickness be such that extra length is required for stud 68, it can extend through bottom aperture 30a in tubular housing 22a in the locked position.

A third embodiment of the receptacle 20b is depicted in FIGS. 15–21. Receptacle 20b is somewhat different in configuration then receptacle embodiment 20 and 20a. Operation of receptacle 20b is the same as the previous embodiments with respect to the type of panels being fastened and the type of stud being utilized for the fastener assembly. The differences in structure reside primarily in the nature of the receptacle and how it is mounted in panel 56. Receptacle 20b has a tubular body portion 110 open at the bottom and at the top and terminating in a peripheral lateral flange 112 at the upper end. The under surface 114 of flange 112 is integrally formed with a square shaped shoulder 116 of lesser diameter, shoulder 116 is adapted to fit in square shaped aperture 58 of panel 56 in a similar manner as with the previously discussed embodiments. Similarly, under surface 114 of flange 112 is adapted to engage with the upper surface 64 of panel 56 when the receptacle is locked in position. The tubular body 110 includes a pair of opposed openings 118 and 120 adjacent to the underside of square shaped shoulder 116 and extending laterally through a portion of the shoulder 116 and integral flange 112. Further, a pair of opposed key ways 122 and 124 are provided adjacent the lower end of tubular housing 110 and bear the same type of configuration and operate in the same manner to capture a notched pin 126 as in the previously discussed embodiment. It should be noted that in this embodiment, the portions of pin 126 which extend outwardly from the walls of tubular portion of 110 have an additional function. They form a seating surface for a helical spring 128 which is mounted on the exterior surface of tubular portion 110 and has its lower end resting on the extending portions of pin 126. Positioned on the upper end of spring 128 is a square shaped retainer latch 130 which has a central aperture 132 to permit its passage onto tubular portion 110. The relative dimension of retainer latch 130 is substantially the same as shoulder 116 to permit its passage through square shaped opening 58 in panel 56. At predetermined angular locations adjacent to opening 132 are appropriate notches 134 to facilitate engagement by a tool such as a screwdriver in order to displace latch 130 and rotate it into the locking position.

With plate 130, spring 128, and pin 126 mounted on receptacle housing 110 in the initial position with the upper surface of shoulder 116 and a bias on spring 128, receptacle 20b is in condition for assembly to panel 56. The receptacle is inserted through aperture 58 until the shoulder 116 is properly located in aperture 58. An appropriate tool is then inserted through the opened upper end of the receptacle into engagement with notches 134. Opposed openings 118 and 120 permit access to the notches 134 and accordingly the retainer latch 130. Depression of latch plate 130 will further compress spring 128 and free latch plate 130 below the under surface 66 of panel 56. The plate can then be rotated a desired amount such as 45 degrees as depicted to reach a position at which it would be out of alignment with square shoulder 116 and square aperture 58 whereupon release of the latch plate will permit spring 128 to force the plate upward into engagement with under surface 66 thereby locking the receptacle 20b in position.

Coupling with stud 68 and panel 70 can then be accomplished in the same manner as in the previously two discussed embodiments with pin 126 forming the cam follower for spiral cam slots 74. All three receptacle embodiments can be removed from panel 60 by reversing the procedure discussed above for locking them in place.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. A front insert receptacle for fastening two members together comprising:

a housing opened at one end to removably receive a stud therein;

a stop surface on the housing to engage with the upper surface of one member when the receptacle is partially extended through an opening therein;

rotational stop means on the housing to prevent rotation of the housing with respect to the one member when extended therein;

at least one cam slot on the housing and a cam follower on the housing captured by the cam slot and initially in a first position when the housing is inserted in the one member;

biasing means on the housing in engagement with the cam follower and responsive to movement of the cam follower along the cam slot into alignment with a portion of the slot which permits the biasing means to direct a portion of the cam follower into engagement with the undersurfaced of the one member to retain the receptacle in position on the one member;

stud locking means on the housing adapted to engage with a stud after the housing has been mounted on the one member and the stud has been mounted on the other member and inserted into the housing where upon relative rotation of the stud with respect to the housing in one direction will activate the stud locking means and relative rotation of the stud with respect to the housing in a second direction will diactivate the stud locking means and permit the stud to be removed from the housing and the two members to be separated.

2. The invention in accordance with claim 1 wherein the housing has a tubular configuration terminating in a square shaped flange at the open end, a square shaped under surface on the flange adapted to mate with a square shaped aperture in the one member to prevent relative rotation therebetween, two opposing cam slots in the housing with each cam slot having a horizontal portion intermediate the ends of the housing and communicating a vertical portion extending from the horizontal portion and being open at the upper end of the housing.

3. The invention in accordance with claim 2 wherein the cam follower and biasing means includes a double wound spring captured within the tubular portion of the housing with the spring having a transverse lower portion located in the housing below the lower rim of the horizontal portion of the slots and upwardly and outwardly extending opposing free ends on the spring initially positioned at the end of the horizontal portion of the slots distal from the vertical portion and being compressed at that location whereupon engagement of the bottom portion of the spring and rotation thereof will cause rotation of the biased free ends of the spring until they are in alignment with the opposed vertical slot portions of the cam slots whereupon the free ends will snap upward into engagement with the aligned undersurface of the one member so as to clamp the one member between the undersurface of the flange of the housing and the upper surface of the free ends of the double wound spring.

4. The invention in accordance with claim 3 wherein the lower portion of the spring captured within the housing forms a resilient transverse member for interengagement with a helical slot on the end of a stud when the stud is rotated with respect thereto thereby forming means to lock the stud to the receptacle.

5. The invention in accordance with claim 4 wherein the stud is in the form of a tubular body portion having a spiral cam slot at one end for interengagement with the spring and an enlarged head portion at the other end so that when the tubular body portion is extended through an opening in the other member and the enlarged head engages with the outer surface of the other member and the stud is rotated into locking engagement with the receptacle, the two members will be fastened together and relative rotation therebetween in the opposite direction will free the stud from the spring in the receptacle and permit removal of the stud and disassembly of the two members.

6. The invention in accordance with claim 5 wherein gripping means is on the enlarged head of the stud to facilitate engagement and rotation of the stud with respect to the receptacle.

7. The invention in accordance with claim 1 wherein the housing is in the form of a tubular body open at one end with an enlarged peripheral flange surrounding a substantial portion of the upper open end of the housing, the undersurface of the flange adapted to interengage with the upper surface of the one member when the tubular body portion is inserted therein, a recessed square-shaped inner flange integrally formed with the under surface of the upper flange and the upper end of the tubular body and being adapted to be inserted in a corresponding square-shaped opening in the one member so as to form the stop surface on the housing to prevent relative rotation therebetween, a pair of opposing cam slots in the housing with each cam slot including a horizontal portion intermediate the ends of the housing terminating at one end in a vertical portion opened at the upper end of the housing, a pair of dimetrically opposed key ways in the walls of the housing and forming part of the stud locking means.

8. The invention in accordance with claim 7 wherein the stud locking means include a transverse pin in the housing and having its end portions mounted in the opposing key ways which are positioned to permit limited vertical reciprocal movement of the pin so that interengagement between the pin and a spiral cam slot in the end of a stud inserted in the housing will permit the pin to follow the cam slot in the stud as the stud is rotated between the locking and unlocking positions.

9. The invention in accordance with claim 8 wherein the cam follower includes a ring shaped base with a central opening for passage of a portion of a stud therethrough, a pair of opposing tabs extending from the outer periphery of the ring and adapted to be inserted in the opposing horizontal portion of the slots, the ring and tabs including means thereon adapted to be engaged for rotation of the ring and tabs so that the tabs extend into alignment with the vertical portion of the openings in the housing whereupon the biasing means will force the tabs upward into engagement with the undersurface of the one member thereby locking the receptacle in position.

10. The invention in accordance with claim 9 wherein a helical spring is captured between the transverse pin and the ring and is compressed when the tabs of the ring are in the horizontal portions of the opposing slots so that when the ring is rotated to bring the tabs into alignment with the vertical openings the spring will force the tabs upward into locking engagement with the undersurface of the one member.

11. The invention in accordance with claim 10 wherein the pin is adapted for interengagement with spiral cam surfaces on the end of a stud inserted into the housing so that rotation of the stud with respect to the housing will shift the pin upwardly along the cam surfaces and compress the spring thereby exerting a force to retain the pin in position at the end of the cam surfaces and the stud locked to the receptacle and relative rotation of the stud with respect to the pin in the opposite direction will permit the pin to disengage with the cams surfaces on the stud and to be returned to the initial position in the housing under the force of the spring to permit disassembly of the stud from the receptacle.

12. The invention in accordance with claim 9 wherein the receiving surfaces on the ring and tabs for engagement and rotation of the ring include a pair of opposed notches in the pair of opposed tabs in position to receive a tool for engagement and rotation of the ring and tabs.

13. The invention in accordance with claim 1 wherein the housing includes a tubular body portion terminating at an open upper end in a peripheral flange, integral with the under surface of the flange and the adjacent walls of the tubular portion is a square shaped shoulder adapted to be inserted in a corresponding opening in said one member to prevent relative rotation therebetween with the undersurface of the flange resting on the upper surface of the one member, a pair of opposing openings in the side walls of the tubular portion of the housing so as to provide the cam slot openings for engagement with the cam follower and shifting of the cam follower between its initial position and the position in which it assists in retaining the receptacle within the one member, a pair of opposing vertical key-ways adjacent the bottom end of the tubular portion of the receptacle and being adapted to receive a portion of the stud locking means therein and permit movement thereof for the purpose of shifting a stud with respect to the receptacle between a locked and unlocked position.

14. The invention in accordance with claim 13 wherein the cam follower includes a square shaped latch plate adapted to be initially inserted through a square shaped opening in the one member when in alignment with the square shaped shoulder on the receptacle, the square shaped latch plate being slideably mounted on the tubular body portion and including surfaces thereon normally positioned in alignment with the opposed openings to permit engagement therewith and to direct the latch plate downward against the force of the biasing means and to rotate the latch plate out of alignment with the square shaped shoulder whereupon release of the latch plate will permit the biasing means to force the latch plate against the under surface of the one member thereby retaining the receptacle in position in the one member and structure on the latch plate to facilitate engagement of a tool therewith for reciprocation and rotation thereof.

15. The invention in accordance with claim 14 wherein a pin is mounted in the opposing keyways in the lower portion of the receptacle and is adapted to be reciprocally vertically moved therein between the upper and lower ends of the keyway with the pin extending transversely across the interior of the receptacle, a biasing means including a helical spring positioned on the exterior surface of the tubular member and captured between the undersurface of the latch plate and the upper surface of the transverse pin extending through and beyond the keyway openings in the receptacle, the transverse pin adapted to be interengaged with a spiral cam slot on the lower end of a stud so that when the stud is passed through the other member and positioned within the receptacle in the one member with the helical slot therein being brought into engagement with the transverse pin, upon rotation of the cam slot the pin will follow the cam slot through its freedom of movement in the opposed keyways until the stud is locked through the receptacle thereby fastening the two members together and biasing the spring to assist in retaining the pin within the cam slot and holding the two members together, and relative rotation in the opposite direction will direct the transverse pin out of the helical cam slot in the stud and permitting the biasing means to return the pin to the lower end of the keyway and permitting the two members to be separated.

16. The invention in accordance with claim 15 wherein the pin contains a pair of spaced notches positioned to mate with the bottom surface of the keyways to thereby maintain the transverse position of the pin with respect to the tubular body portion of the receptacle.

* * * * *